(12) United States Patent
Byrne

(10) Patent No.: US 6,191,364 B1
(45) Date of Patent: Feb. 20, 2001

(54) CLAMPING CONSTRUCTION FOR AN AUTOMOTIVE WIRING HARNESS

(75) Inventor: Robert Byrne, Yokkaichi (JP)

(73) Assignee: Sumitomo Wiring Systems, Ltd. (JP)

( * ) Notice: Under 35 U.S.C. 154(b), the term of this patent shall be extended for 0 days.

(21) Appl. No.: 09/251,653

(22) Filed: Feb. 17, 1999

(30) Foreign Application Priority Data

Feb. 27, 1998 (JP) ................................................... 10-47685

(51) Int. Cl.⁷ ........................................................ H02G 3/14
(52) U.S. Cl. ....................... 174/72 A; 174/135; D8/356; D13/154; 361/826
(58) Field of Search ............................ 174/72 A, 72 TR, 174/72 C, 135, 138 G, 60, 68.1; D8/356, 357; D13/154, 155; 361/826, 827, 828

(56) References Cited

U.S. PATENT DOCUMENTS

| | | | |
|---|---|---|---|
| 3,409,971 | * 11/1968 | Morrow | 174/72 A |
| 3,711,632 | * 1/1973 | Ghirardi | 174/135 |
| 5,266,740 | * 11/1993 | Hsu | 174/135 |
| 5,937,745 | * 8/1999 | Boe | 174/135 |

FOREIGN PATENT DOCUMENTS 6-84089   12/1994   (JP).

* cited by examiner

*Primary Examiner*—Kristine Kincaid
*Assistant Examiner*—Adolfo Nino
(74) *Attorney, Agent, or Firm*—Anthony J. Casella; Gerald E. Hespos; Michael J. Porco

(57) ABSTRACT

A clamping construction is provided to hold an automotive wiring harness more securely. One end 1a of a connector holder 1 on which an automotive wiring harness 2 is placed and one end 3a of a clamp 3 are rotatably coupled by a hinge 7. A projecting guide 4 and a lock claw 5 are provided at the other end of the connector holder 1, and a projected portion 3d is formed at an other end 3b of the clamp 3. At the leading end of the projected portion 3d is formed a lock hole 6. The projected portion 3d is formed such that a contact portion of the outer surface of the projected portion 3d and the inner surface of the projecting guide 4 extends to the projecting end of the projecting guide 4.

5 Claims, 4 Drawing Sheets

CLAMPING CONSTRUCTION FOR AN AUTOMOTIVE WIRING HARNESS

BACKGROUND OF THE INVENTION

1. Field of the Invention.

The present invention relates to a clamping construction for holding an automotive wiring harness in a specified position.

2. Description of the Related Art.

A known clamping construction for an automotive wiring harness is constructed, for example, as shown in FIG. 5. Specifically, this prior art clamping construction is comprised roughly of a connector holder 1 on which an automotive wiring harness 2 is placed and a clamp 13 having a substantially semicircular cross section for holding the wiring harness 2. One end 1a of the connector holder 1 and one end 13a of the clamp 13 are coupled via a hinge 17.

At the other end of the connector holder 1 are formed a projecting guide 4 standing on the connector holder 1 and a lock claw 5 provided more toward the hinge 17 than the projecting guide 4.

On the other hand, a rib 13c is formed on the outer surface of the clamp 13, and an arm 13d continuous with the rib 13c is formed at an other end 13b of the clamp 13. At the leading end of the arm 13d, a lock hole is formed in a position corresponding to the lock claw 5.

The above described prior art clamping construction is used by opening the clamp 13 and placing the wiring harness 2 on the connector holder 1 to extend in a direction normal to the plane of FIG. 5. Thereafter, the clamp 13 is rotated about the hinge 17. At this time, the lock hole formed at the leading end of the arm 13d is guided to the lock claw 5 to be engaged therewith by the contact of the arm 13d and the projecting guide 4 with each other. When the clamp 13 is closed at the end of its rotation, the lock claw 5 and the lock hole are engaged.

By engaging the lock claw 5 of the connector holder 1 and the lock hole of the clamp 13 as above, the wiring harness 2 can be held on the connector holder 1.

If a small load F11 acts on an upper side of the contact surface, e.g. in a lateral or horizontal direction, the other end 13b and the arm 13d of the clamp 13 are easily movable. Thus, the other end 13b and the arm 13d are likely to be deformed, for example, when the clamp 13 is closed during the assembling or a small load acts in the lateral direction. Such a deformation may inadvertently disengage the lock claw 5 and the lock hole.

Due to the above readiness of the other end 13b and the arm 13d to deform (lacking rigidity), they often are deformed without being noticed by an operator during manual assembling. Such deformations of the other end 13b and the arm 13d cause the leading end of the arm 13d to move beyond the projecting guide 4 or not to reach the lock claw 5 when the clamp 13 is closed, with the result that the lock claw 5 and the lock hole cannot be engaged with each other. In such a case, an extra operation to engage the lock claw 5 and the lock hole is required.

Further, if it is not found out that the lock claw 5 and the lock hole are not engaged, the wiring harness 2 slackens in an automotive vehicle. This may give rise to vibration and unnecessary noises or damage the wiring harness 2 itself.

In view of the above problems, an object of the present invention is to provide a clamping construction for an automotive vehicle which can more securely hold the automotive wiring harness.

SUMMARY OF THE INVENTION

According to the invention there is provided a clamping construction for an automotive wiring harness, comprising a base on which an automotive wiring harness is placed or placeable or positioned. A clamp has one end (first end) thereof coupled with the base and is adapted to hold the automotive wiring harness. A locking construction is provided for coupling the base and the clamp or for locking them in a substantially closed position. A projecting guide is provided on the base for guiding the clamp to a coupling position where the clamp and the base are coupled, and a projected portion is provided on the clamp to correspond to or mate with the projecting guide. The projected portion is formed such that a contact portion thereof with the projecting guide extends at least to a projecting end of the projecting guide in the coupling position. Alternatively the longitudinal length of the projected portion is substantially equal to or greater than the contact length of the projected portion with the projecting guide.

As described in detail above, the maximum permissible ranges of the clamp and the projected portion in response to the load vertically acting on the contact surface of the projected portion and the projecting guide can be increased. That is the strength of the clamp and the projected portion in response to the load e.g. vertically acting on the contact surface of the projected portion and the projecting guide can be increased by extending the contact portion of the projected portion to a projecting end of the projecting guide. Further, deformations of the clamp and the projected portion caused by the vertically acting load can be reduced. Furthermore, a possibility that the base and the clamp are inadvertently disengaged due to the deformations of the clamp and the projected portion can substantially be eliminated. Consequently extra operations due to the above deformations during the coupling of the base and the clamp can be avoided.

According to a preferred embodiment of the invention, the projected portion extends over the opposite side edges of the clamp. Accordingly, the projected portion is formed such that the contact portion thereof with the projecting guide extends to the projecting end of the projecting guide in the coupling position. As a result, a contact area of the projected portion and the projecting guide is at maximum. Thus, even if a load vertically acts on the contact surface, movements of the clamp and the projected portion in the load acting direction can be suppressed. This increases maximum permissible ranges of the clamp and the projected portion in response to the load vertically acting on the contact surface. More particularly, the strength of the clamp and the projected portion in response to the load e.g. vertically acting on the contact surface of the projected portion and the projecting guide can be increased by extending the contact portion of the projected portion to a projecting end of the projecting guide. As a result, deformations of the clamp and the projected portion caused by the vertically acting load can be reduced. Therefore, a possibility that the base and the clamp are inadvertently disengaged can substantially be eliminated.

By providing the projected portion on the clamp, the rigidity of the clamp is increased. Accordingly, a possibility of accidental deformations of the clamp and the projected portion during various manual assembling operations can be reduced. Thus, extra operations due to the above deformations during the coupling of the base and the clamp can be avoided.

Preferably, the base and the clamp are hinge-coupled.

With the above construction, the clamp can be coupled easily with the base by a simple construction.

Further preferably, the base and the clamp are hinge-coupled by a hinge integrally or unitarily formed between the base and the clamp.

With this construction, production processes can be simplified by integrally or unitarily forming the hinge between the base and the clamp.

Still further preferably, the locking construction comprises a male portion provided on either one of the base and the clamp and a female portion provided on the other of the two. With this construction, the lock construction can be simply constructed.

Still further preferably, the clamp comprises one or more ribs. Accordingly, the stiffness or rigidity of the clamp can be enhanced thus reducing the possibility of being deformed when exposed to a load, e.g. of the wiring harness. Most preferably, the ribs are provided on the outer surface or surface opposed to that partially in contact with or adjacent to the wiring harness.

These and other objects, features and advantages of the present invention will become more apparent upon a reading of the following detailed description and accompanying drawings.

DETAILED DESCRIPTION OF THE PREFERRED EMBODIMENTS

Figure 1:
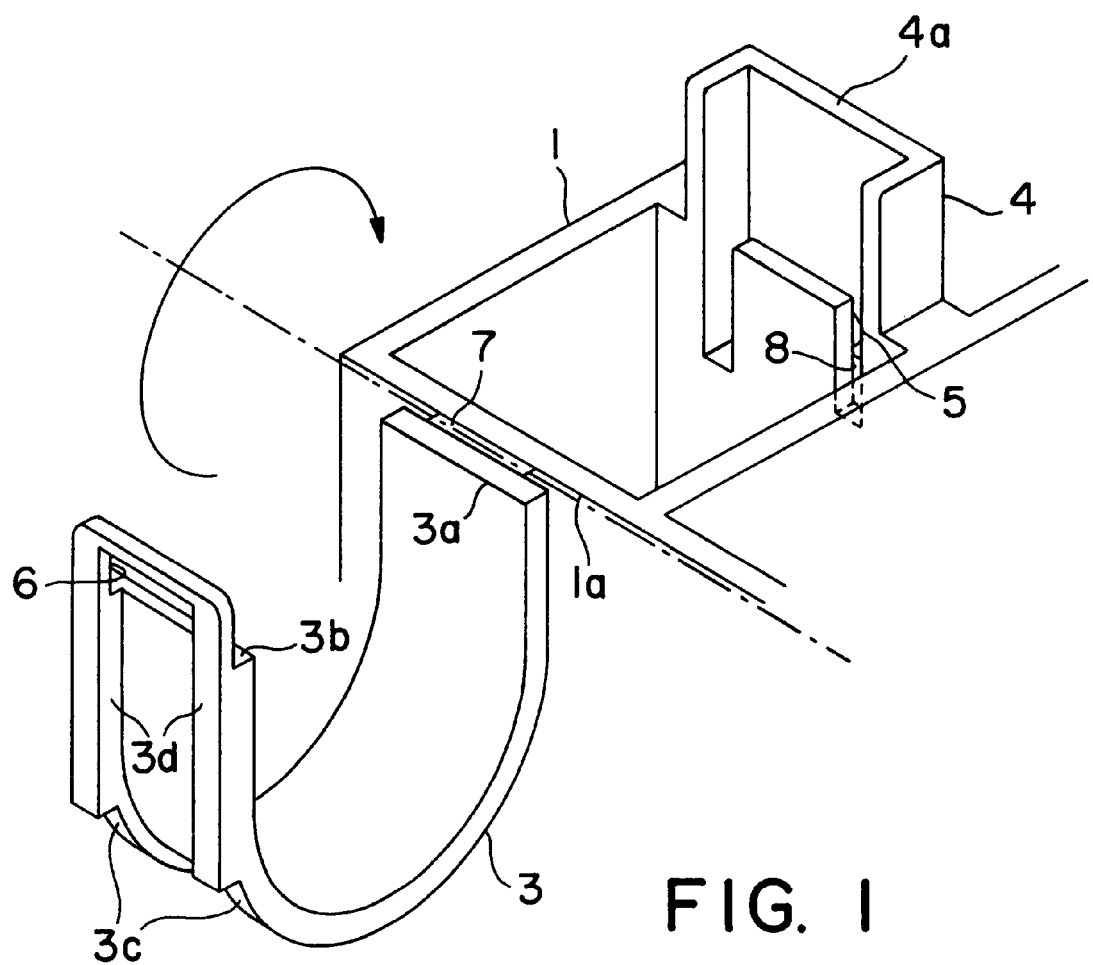
FIG. 1 is a perspective view showing one embodiment of a clamping construction according to the invention.
Figure 2:
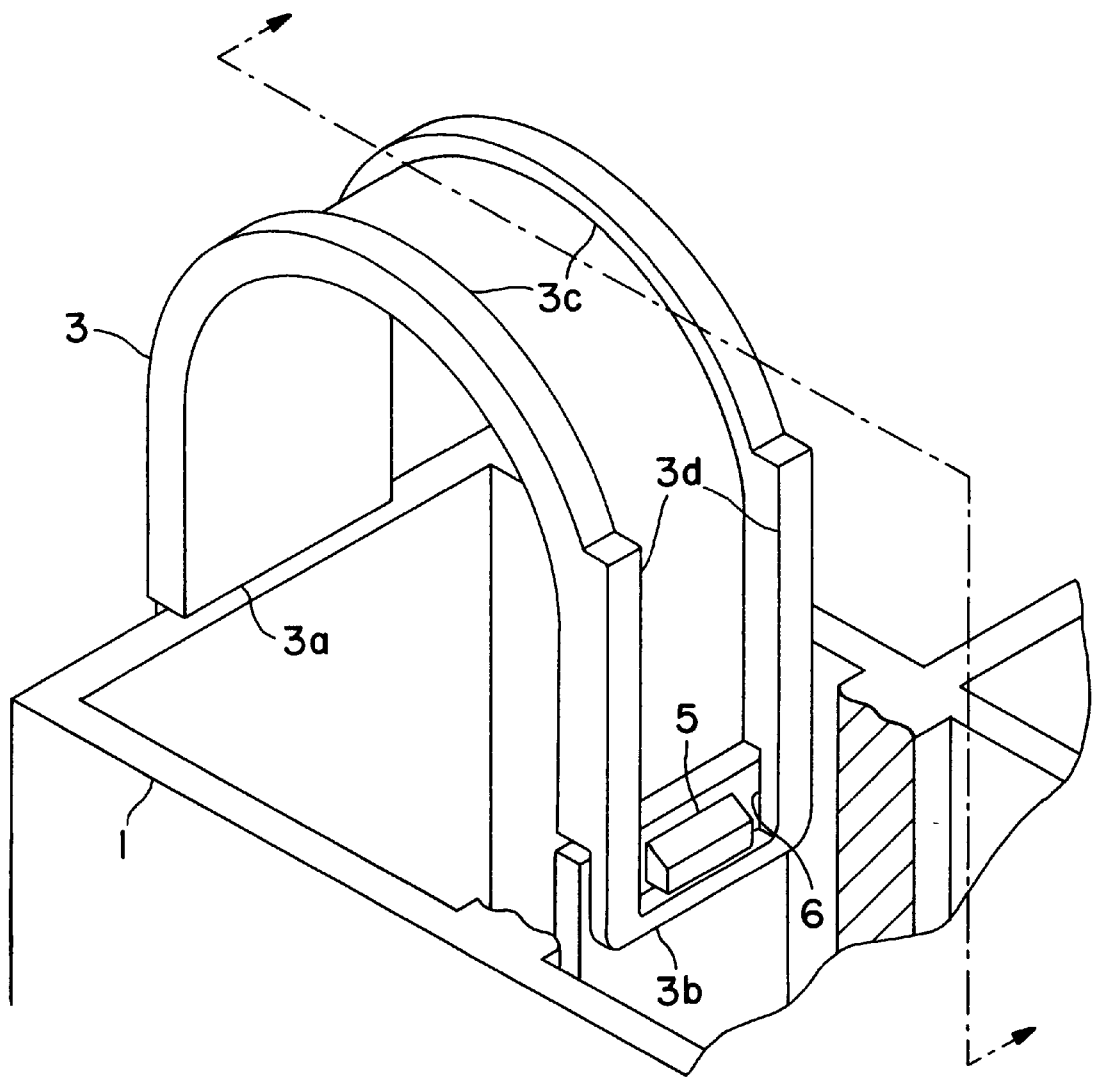
FIGS. 2 and 3 are perspective views of the embodiment when a clamp is closed.

A clamping construction for an automotive wiring harness according to one embodiment of the invention is described with reference to FIGS. 1 to 4. The clamping construction according to this embodiment is comprised of a base or connector holder 1, on which an automotive wiring harness 2 is placed or placeable and a clamp 3 having a substantially U-shaped cross section for holding or positioning the wiring harness 2. One end 1a of the connector holder 1 and one end (first end) 3a of the clamp 3 are rotatably or pivotably coupled via a hinge 7 integrally or unitarily formed between the connector holder 1 and the clamp 3.

At the other or opposed end of the connector holder 1 are formed a projecting guide 4 standing on or projecting from the connector holder 1, and an insertion hole 8 which is located more toward the hinge 7 than the projecting guide 4. On an inner surface of the insertion hole 8 is provided a lock claw 5 having its upper surface slanted.

On the other hand, ribs 3c are formed preferably at the opposite side edges of the outer surface of the clamp 3, and a projected portion 3d is so formed as to be substantially continuous or flush with the ribs 3c at the other end (second end) 3b of the clamp 3. At the leading end of the projected portion 3d, a substantially rectangular lock hole 6 is formed in a position corresponding to the lock claw 5.

In this embodiment, the projected portion 3d is formed such that a contact portion of the outer surface of the projected portion 3d and the inner surface of the projecting guide 4 extends to the projecting end 4a of the projecting guide 4, thereby ensuring a maximum length L (see FIG. 4) of the contact portion. In other words, the projected portion 3d is formed or configured such that a contact area of the inner surface of the projecting guide 4 and the outer surface of the projected portion 3d is at maximum.

Figure 5:
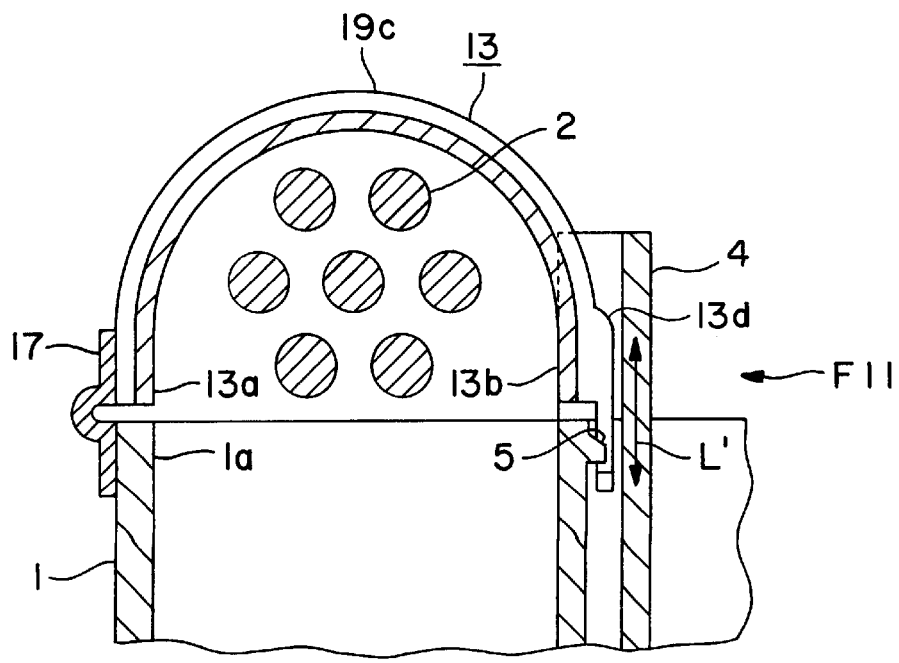
FIG. 5 is a section of a prior art clamping construction when a clamp is closed.

In the prior art construction, a contact line length L' by which the inner surface of the projecting guide 4 and the outer surface of the arm 13d are in contact is (in contrast to the invention) short as shown in FIG. 5. In other words, a contact area of the inner surface of the projecting guide 4 with the outer surface of the arm 13d is small.

Figure 3:
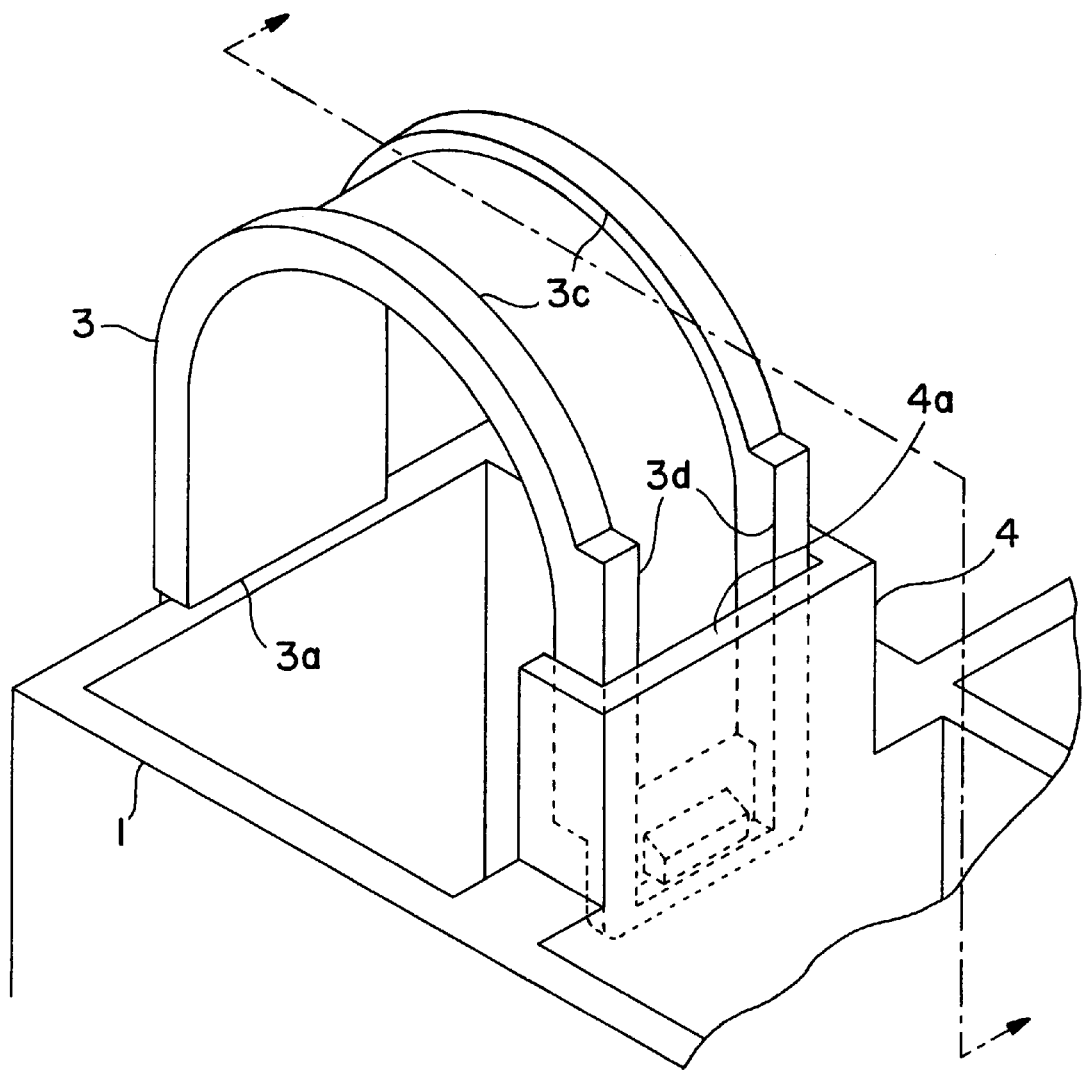

The projecting guide 4 at least partially surrounds the outer surfaces (i.e. the surfaces other than those oriented toward the wiring harness 2) of the second end 3b of the clamp 3 in its locked position (FIG. 3).

With the above construction, the automotive wiring harness 2 is clamped in the following manner.

Figure 4:
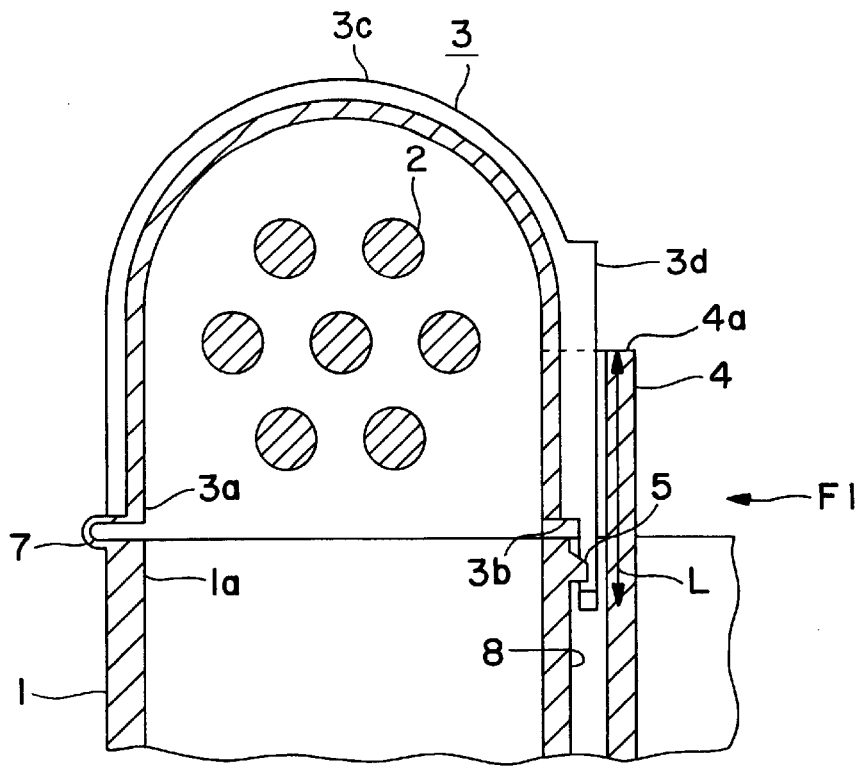
FIG. 4 is a section of the embodiment when the clamp is closed.

With the clamp 3 opened, the wiring harness 2 is placed on the connector holder 1 to extend in a direction at an angle different from 0° or 180°, preferably substantially normal to the plane of FIG. 4 or in a longitudinal direction of the wiring harness 2. Thereafter, the clamp 3 is rotated or pivoted about the hinge 7. At this time, the leading end of the projected portion 3d is guided into the insertion hole 8 by the contact of the projected portion 3d and the projecting guide 4 with each other, leading to the engagement of the lock hole 6 formed in the projected portion 3d with the lock claw 5. When the clamp 3 is closed at the end of its rotation, the lock claw 5 and the lock hole 6 are engaged to lock the clamp 3 in its locked or closed position.

The wiring harness 2 can be held on the connector holder 1 by engaging the lock claw 5 of the connector holder 1 with the lock hole 6 of the clamp 3 in the above manner.

As described above, the projected portion 3d is formed such that the contact length and/or contact area of the inner surface of the projecting guide 4 and the outer surface of the projected portion 3d is at maximum or at least augmented. Accordingly, even if a load F1 (see FIG. 4) acts, e.g. in a lateral direction, movements of the second end 3b and projected portion 3d of the clamp 3 in the acting direction of the load F1 are suppressed. Thus, maximum permissible ranges of the second end 3b and the projected portion 3d in response to the laterally acting load are increased, with the result that the degrees of deformation of the second end 3b and the projected portion 3d caused by the laterally acting load can be reduced. Therefore, a possibility that the lock claw 5 of the connector holder 1 and the lock hole 6 of the clamp 3 are inadvertently disengaged is substantially eliminated or reduced.

Further, by forming the projected portion 3d at the second end 3b of the clamp 3, the rigidity of the second end 3b and its peripheral structure can be enhanced. Accordingly, a possibility of accidental deformations of the second end 3b and the projected portion 3d of the clamp 3 during various manual assembling operations can be reduced. In the case that the second end 3b and the projected portion 3d of the clamp 3 are deformed, the lock claw 5 and the lock hole 6 may not be engageable with each other because of the leading end of the projected portion 3d moving beyond the projecting guide 4 or not reaching the lock claw 5. In such a case, an extra operation of engaging the lock claw 5 and the lock hole 6 is required. According to this embodiment, such a superfluous operation can be avoided.

As described in detail above the following effects can be obtained according to this embodiment.

The maximum permissible ranges of the second (other) end 3b and the projected portion 3d of the clamp 3 in response to a load acting in a lateral direction on the contact surface of the projected portion 3d of the clamp 3 and the projecting guide 4 can be increased.

The degrees of deformation of the second end 3b and the projected portion 3d of the clamp 3 caused by the load laterally acting on the contact surface can be reduced.

The possibility that the lock claw 5 of the connector holder 1 and the lock hole 6 of the clamp 3 are inadvertently disengaged due to the deformation of the second end 3b and the projected portion 3d of the clamp 3 can substantially be eliminated.

A superfluous operation required when the lock claw 5 and the lock hole 6 are not engageable due to the deformation of the second end 3b and the projected portion 3d of the clamp 3 can be avoided.

The lock hole 6 and the lock claw 5 can be engaged smoothly when the clamp 3 is closed.

The clamp 3 and the connector holder 1 can be coupled more securely.

By the above secure coupling, the wiring harness 2 can more securely be brought closer to a connector arranged in the connector holder 1 by holding the wiring harness on a specified path or in a predetermined or predeterminable orientation.

The other end 3b of the clamp 3 and the other end of the connector holder 1 can be coupled easily within a short time by rotating the clamp 3.

The one end 1a of the connector holder 1 and the one end 3a of the clamp 3 can be coupled simply by the hinge 7. Further, a production process can be simplified by integrally forming the hinge 7 between the one end 1a of the connector holder 1 and the one end 3a of the clamp 3.

The other end of the connector holder 1 and the other end 3b of the clamp 3 can be coupled by a simple construction comprised of the lock claw 5 and the lock hole 6.

The present invention is not limited to the foregoing embodiment, but may be modified as follows.

In the foregoing embodiment, the one end 1a of the connector holder 1 and the one end 3a of the clamp 3 are coupled by the hinge 7 integrally or unitarily formed therebetween. However, a hinge may be provided separately.

Although the one end 1a of the connector holder 1 and the one or first end 3a of the clamp 3 are coupled by the hinge 7 integrally formed therebetween in the foregoing embodiment, any desired construction for the coupling may be adopted provided that both ends 1a, 3a are rotatably or pivotably coupled.

In the foregoing embodiment, the other end of the connector holder 1 and the second or other end 3b of the clamp 3 are coupled by the lock claw 5 provided on the other end of the connector holder 1 and the lock hole provided in the second or other end 3b (the leading end or distal end of the projected portion 3d) of the clamp 3. However, a lock hole may be provided in the other end of the connector holder 1 and a lock claw may be provided on the second or other end 3b of the clamp 3.

Although the projected portion 3d extends over the opposite side edges of the other end 3b in the foregoing embodiment, it may be formed, for example, on a surface including the opposite side edges of the second or other end 3b.

Although the wiring harness 2 is held on the connector holder 1 in the foregoing embodiment, it may be held on a junction box, relay box or other container provided that it is held in a specified position.

Although the clamp 3 is depicted as being substantially semicircular it may have any other shape substantially corresponding to or mating with the outer shape of the wiring harness 2.

As described in detail above, the maximum permissible ranges of the clamp and the projected portion in response to the load vertically acting on the contact surface of the projected portion and the projecting guide can be increased.

Further, the deformations of the clamp and the projected portion caused by the vertically acting load can be reduced.

Furthermore, a possibility that the base and the clamp are inadvertently disengaged due to the deformations of the clamp and the projected portion can substantially be eliminated. Further, an extra operation due to the above deformations during the coupling of the base and the clamp can be avoided.

Furthermore, the clamp can easily be coupled with the base by a simple construction. Preferably, a production process can be simplified by integrally forming the hinge between the base and the clamp. Most preferably, the lock construction can be simply constructed.

What is claimed is:

1. A clamping construction for an automotive wiring harness, comprising:
    a base for receiving an automotive wiring harness, the base having a first locking construction;
    a clamp having a first end coupled with the base at a location spaced from the first locking construction, the clamp further having a second end, said clamp being rotatable into a coupling position such that the second end of the clamp is positioned adjacent the first locking construction on the base, portions of the clamp between the ends having inner and outer surfaces, the inner surface being configured to hold an automotive wiring harness adjacent the base, at least one rib projecting outward a selected distance from the outer surface and extending from the first end of the clamp toward the second end;
    a second locking construction formed on the clamp in proximity to the second end for engaging the first locking construction and coupling the base and the clamp in the coupling position;
    a projecting guide provided on the base at a location for guiding the second end of the clamp to the coupling position where the clamp and the base are coupled, the projecting guide having a projecting end spaced from the base; and
    a projected portion provided on the outer surface of the clamp and extending from the rib substantially to the second end of the clamp, the projected portion projecting from the outer surface of the clamp a distance greater than the selected distance by which the rib projects from the outer surface, the projected portion defining a length from the second end of the clamp to the rib, the length being selected such that the projected portion extends at least to the projecting end of the projecting guide when the clamp is in the coupling position.

2. A clamping construction according to claim 1, wherein the projected portion extends over at least part of opposite side edges of the clamp.

3. A clamping construction according to claim 2, wherein the base and the clamp are hinge-coupled.

4. A clamping construction according to claim 3, wherein the base and the clamp are hinge-coupled by a hinge unitarily formed between the base and the clamp.

5. A clamping construction according to claim 4, wherein the first and second locking constructions comprise a male portion provided on either one of the base and the clamp and a female portion provided on the other of the two.

* * * * *